United States Patent
Agner

(10) Patent No.: US 6,783,479 B2
(45) Date of Patent: Aug. 31, 2004

(54) AUTOMATIC TRANSMISSION

(75) Inventor: Ivo Agner, Bühl-Vimbuch (DE)

(73) Assignee: Luk Lamellen und Kupplungen Beteiligungs KG, Bühl (DE)

( * ) Notice: Subject to any disclaimer, the term of this patent is extended or adjusted under 35 U.S.C. 154(b) by 0 days.

(21) Appl. No.: 10/101,448

(22) Filed: Mar. 19, 2002

(65) Prior Publication Data

US 2002/0155920 A1 Oct. 24, 2002

(30) Foreign Application Priority Data

Mar. 19, 2001 (DE) .......................... 101 13 226

(51) Int. Cl.⁷ .................. B60K 41/12; B60K 41/02; B60K 41/24; B60K 41/28
(52) U.S. Cl. .............. 477/39; 477/50; 477/91; 477/156
(58) Field of Search .................. 477/39, 43, 46, 477/48, 50, 91, 121, 143, 155, 156, 160, 164; 701/62, 67, 51

(56) References Cited

U.S. PATENT DOCUMENTS

| | | | | |
|---|---|---|---|---|
| 4,345,489 A | * | 8/1982 | Muller et al. ............. | 475/64 |
| 4,790,216 A | * | 12/1988 | Eggert et al. ............. | 477/38 |
| 5,157,992 A | * | 10/1992 | Hayashi et al. ............ | 477/40 |
| 5,725,447 A | | 3/1998 | Friedmann et al. ......... | 474/18 |
| 5,944,626 A | * | 8/1999 | Spiess et al. ............. | 474/28 |
| 6,077,187 A | * | 6/2000 | Suzuki et al. ............. | 477/48 |
| 6,544,139 B1 | * | 4/2003 | Gierer et al. ............. | 475/119 |
| 6,569,044 B1 | * | 5/2003 | Sen et al. ................ | 474/28 |

FOREIGN PATENT DOCUMENTS

| | | | |
|---|---|---|---|
| DE | 195 46 293 A1 | 6/1996 | |
| JP | 63243554 A | * 10/1988 | ............. F16H/5/28 |

* cited by examiner

*Primary Examiner*—Tisha D Lewis
(74) *Attorney, Agent, or Firm*—Alfred J. Mangels

(57) ABSTRACT

A method and apparatus for operating an automatic transmission as a function of the engine rotational speed of a variable speed internal combustion engine. Upon a failure of the electronic control system, a return home of a motor vehicle under its own power is enabled. A delivery system delivers a working medium with which a transmission ratio adjusting device is actuated by a first control device that, in turn, is controlled by a pilot pressure that can be accurately changed by a second control device to actuate the transmission ratio adjusting device. The pilot pressure for controlling the first control device is changed by a third control device as a function of the rotational speed of the internal combustion engine when an adjusting device is switched out of a normal operation position into an emergency operation position.

12 Claims, 4 Drawing Sheets

AUTOMATIC TRANSMISSION

BACKGROUND OF THE INVENTION

1. Field of the Invention

The invention relates to a method for operating an automatic transmission as a function of, among other things, engine rotational speed. The invention also relates to an automatic transmission for a variable speed internal combustion engine, with a delivery system for a working medium with which at least one adjusting device is acted on by a first control device which, in turn, is controlled by a pilot pressure that can be accurately changed by a second control device to operate the adjusting device.

2. Description of the Related Art

A similar method and a similar automatic transmission are disclosed in German Patent Publication No. DE 195 46 293 A1, in which is disclosed a belt driven, conical pulley transmission with input side and output side pairs of conical disks. The power transmission between the two pairs of conical disks can be effected by a steel loop or band. Each pair of conical disks includes an axially movable disk and an axially fixed conical disk. The axially displaceable conical disk halves are arranged diagonally opposite each other. By an axial displacement of the movable conical disk halves, the effective lever arms of the pairs of conical disks become larger or smaller in opposite directions.

The axial displacement of the movable conical disk halves is achieved with an adjusting device. A first control device actuates the adjusting device. The first control device includes one or two hydraulic valves to which a pilot pressure is applied. The first control device is controlled by an electrically actuated second control device, for example a proportional valve. To adjust the transmission ratio of the belt driven, conical disk transmission, depending upon the demand, the pilot pressure is accurately changed by the second control device, for example by suitable software.

In the event of an electronic failure, the adjusting device can no longer be controlled by the first control device because of the failure of the electronically-operated second control device, and the automatic transmission will no longer function. Consequently, continued operation (limp home) of a motor vehicle with that type of automatic transmission is no longer possible by its own power, and it must therefore be towed away.

The object of the invention is to provide an appropriate method and an appropriate automatic transmission that enable continued operation by its own power when an electronic failure occurs and/or the second control device fails.

SUMMARY OF THE INVENTION

The object is attained with a method for operating an automatic transmission as a function of, among other things, the engine rotational speed, in that the transmission ratio is changed to a limp home condition of the automatic transmission after a starting procedure in order to maintain the engine rotational speed at a specific constant value. A transmission ratio of high speed results when the engine rotational speed increases, and a transmission ratio of low speed results when the engine rotational speed decreases. A constant engine rotational speed is maintained through the transmission ratio control in a limp home condition.

A preferred embodiment of the method is characterized in that the transmission ratio is adjusted to a high speed ratio, after the starting process, at increasing engine rotational speed, until the minimum possible transmission ratio condition is reached, which is then maintained during further increases in engine rotational speed. After reaching the minimum transmission ratio condition, the engine rotational speed can no longer be maintained constant, and it increases until the engine performance is in equilibrium with the running resistance.

Another preferred embodiment of the method is characterized in that the transmission ratio, after the starting process, is adjusted to a low speed ratio at decreasing engine rotational speed, until the largest possible transmission ratio condition is reached, which is then maintained during further decreases in engine rotational speed. After reaching the largest possible transmission ratio condition, the engine rotational speed can no longer be maintained constant and decreases.

A further preferred embodiment of the method is characterized in that, when the rotational speed is increased further, the transfer of torque from an input element to an output element is interrupted with the aid of a clutch or converter. The engine is thereby prevented from stalling.

A further preferred embodiment of the method is characterized in that the specific value at which the engine rotational speed is maintained constant is greater than the so-called stall speed. The maximum rotational speed at which a clutch or a converter can still slip is designated as the stall speed. The stall speed is therefore the rotational speed at which the converter or the clutch stops the engine with completely applied brakes and full throttle. A certain minimum difference between the stall speed and the transmission ratio control rotational speed is to be maintained for safety reasons.

The object is achieved in an automatic transmission for a variable rotational speed internal combustion engine, with a delivery system for a working medium, with which at least one adjusting device is actuated by a first control device, which, in turn, is controlled by a pilot pressure that can be specifically changed by a second control device in order to operate the adjusting device, in that in addition to the second control device a third control device is provided, which is actuated by a working medium transported by the delivery system, with the help of which the pilot pressure for controlling the first control device is changed as a function of the rotational speed of the internal combustion engine, when a switching device is switched from a normal position to a limp home position.

The automatic transmission in accordance with the invention is distinguished by an additional third control device, which is hydraulically or pneumatically operated by the working medium transported by the delivery system. As a result, the operation of the adjusting device is ensured even when the second control device fails. In that way an emergency operation of the automatic transmission is ensured, so that continued operation, for example to the nearest service station, is possible.

One embodiment of the automatic transmission is characterized in that the delivery system for the working medium is composed of a pump whose delivered volumetric flow depends upon the rotational speed of the internal combustion engine. That can be achieved, for example, by coupling the input of the pump with the camshaft or the crankshaft of the internal combustion engine. The volumetric flow of the pump, which is dependent upon the speed of the internal combustion engine, is utilized in a so-called limp home condition of the automatic transmission for controlling the transmission ratio of the transmission and/or a starting clutch.

A further embodiment of the automatic transmission is characterized in that the third control device has an axially-displaceable, spring-biased control plunger with a first and second working surface for the working medium delivered by the delivery system, as well as with a third working surface, which is contacted by the regulated pilot pressure, whereby the first and second working surfaces on the control plunger of the third control device, which are contacted by the working medium, are of the same size. In the normal condition of the transmission, the same working medium pressure acts on the first and second working surfaces on the control plunger of the third control device. The magnitude of the regulated pilot pressure can be adjusted by the spring bias acting on the control plunger. The spring-biased control plunger of the third control device functions as a pressure regulator that maintains the pilot pressure at a constant value. Two control edges can be formed on the control plunger, which ensure that the pilot pressure will decrease when it exceeds a specified value, and which will ensure that the pilot pressure will increase when it drops below the specified value.

A further embodiment of the automatic transmission is characterized in that the first and second working surfaces, for the working medium, of the control plunger of the third control device are connected to each other through a connecting conduit, in which an orifice plate is provided, through which flows the working medium that is delivered by the delivery system when the switching device is in the limp home position. In the normal condition of the automatic transmission, the working medium delivered by the delivery system does not flow through the orifice plate. In the limp home condition, the switching device ensures that the working medium delivered by the delivery system flows through the orifice plate. That leads to a different working medium pressure acting on the first working surface of the control plunger of the third control device than on the second working surface. The pressure difference increases with the volumetric flow delivered by the delivery system, which, in turn, is dependent upon the rotational speed of the connected internal combustion engine. The pilot pressure that exists at the third working surface of the control plunger is changed by the pressure difference between the first and second working surfaces for the working medium at the control plunger of the third control device, which is dependent upon the rotational speed of the internal combustion engine. A throttle can be utilized instead of the orifice plate.

A particular embodiment of the automatic transmission is characterized in that the switching device includes an axially displaceable, spring-biased switching plunger, which is moved from its normal position into its limp home position during a limp home condition of the automatic transmission by the spring biasing force, whereby a direct connection between the delivery system and the adjusting device is interrupted and a connection between the delivery system and the adjusting device is released by the orifice plate in the connecting conduit between the first and second working surfaces, for the working medium, that are on the control plunger of the third control device. By the spring biasing force acting on the switching plunger, the switching plunger is also automatically shifted in a simple way into its limp home position when there is a total failure of the electronics. Simultaneously, by the displacement of the plunger to its limp home position, the flow through the orifice plate is forced into the connecting conduit between the first and second working surfaces on the control plunger of the third control device.

A further particular embodiment of the automatic transmission is characterized in that a device for adjusting the transmission ratio of the automatic transmission and a device for adjusting the starting clutch are coupled with the delivery system as well as with the third control device. That provides the advantage that only one delivery system is required to ensure a sufficient transmission ratio as well as a satisfactory functioning of the starting clutch in a limp home condition of the transmission. If a first control device with an increasing characteristic curve is utilized for the control of the adjusting device of the starting clutch, a reversing slide valve is required to ensure a proper function of the starting clutch during limp home.

A further particular embodiment of the automatic transmission is characterized in that in the limp home position of the switching device, between the third pilot pressure working surface on the control plunger of the third control device and a connection to a pressure relief chamber, a control pressure connecting conduit is disconnected, in which there are arranged, starting from the connection to the pressure relief chamber, a first orifice plate, a branch to the adjusting device for the starting clutch, a second orifice plate, and a branch to the transmission ratio adjusting device. The cascade-like arrangement of the orifice plates makes possible agreement between rotational speed and starting pressure, between rotational speed and adjusting pressure, as well as between starting pressure and adjusting pressure. In the limp home position of the switching device, the pilot pressure drops to almost zero at high engine rotational speed. Consequently, the starting clutch is engaged and a transmission ratio of fast (overdrive) results. With decreasing engine rotational speed, the pilot pressure increases and a transmission ratio of slow (underdrive) results.

The stepless automatic transmission in accordance with the invention can also be called a CVT (continuously variable transmission). In a CVT, among other things, the starting and transmission ratio adjustment functions must be ensured. The starting function is assured either directly through a starting clutch or through a torque converter, after an accompanying reverse set clutch has been engaged. The starting clutch is ordinarily engaged by pressure. That can occur, for example, with a valve that increases or reverses the pressure without current. A torque converter starts practically by itself, without hydraulic control contact.

The transmission ratio of the automatic transmission must always be capable of being adjusted, because without pressure and without additional hydraulic transmission ratio adjustment, a transmission ratio of close to 1:1 (somewhere between third and fourth gear) would be set. Therefore, a transmission ratio adjustment is absolutely required in the limp home condition. As a rule, for safety reasons, the transmission ratio adjustment is designed in such a way that when the pilot pressure is close to zero an adjustment of the transmission ratio to fast results.

The basic idea of the emergency operation is as follows. The starting clutch is engaged hydraulically or it is started by the torque converter. Only when that process has been completed does the transmission ratio control to a constant engine rotational speed begin. That means that the transmission ratio control operates in the emergency operating mode so that a constant engine rotational speed is regulated. The engine rotational speed can be, for example, 3,500 revolutions/minute. When the engine rotational speed increases, the transmission ratio is automatically set to fast. When the engine rotational speed decreases, the transmission ratio is automatically set to slow. When a further adjustment of the transmission ratio to fast is no longer possible, the longest transmission ratio is maintained, even when the engine rotational speed increases further. When further adjustment of the transmission ratio to slow is no longer possible, the engine rotational speed drops further. It is only then that the starting clutch or the converter disengages.

During a power failure, the switching device switches to the limp home position. The pilot pressure of the first control device is uncoupled from the second control device and is controlled by the third control device. On the basis of the production by a metering orifice of a pressure that is proportional to the engine rotational speed, the pilot pressure on the first control device is decreased when the engine rotational speed, and thereby the pressure on the metering orifice plate, increases. That, in turn, causes an adjustment of the transmission ratio to fast, and the opposite to slow. The engine rotational speed that is to be controlled results from a coordination of the size of the metering orifice with the springs of the first control device. The connection between increasing pressure on the metering orifice plate and decreasing pilot pressure can be realized with a separate pressure reducing valve.

BRIEF DESCRIPTION OF THE DRAWINGS

Further advantages, features, and details of the invention are provided in the following description, which describes two embodiments of the invention in detail with reference to the drawings, in which.

DESCRIPTION OF THE PREFERRED EMBODIMENTS

Figure 1:
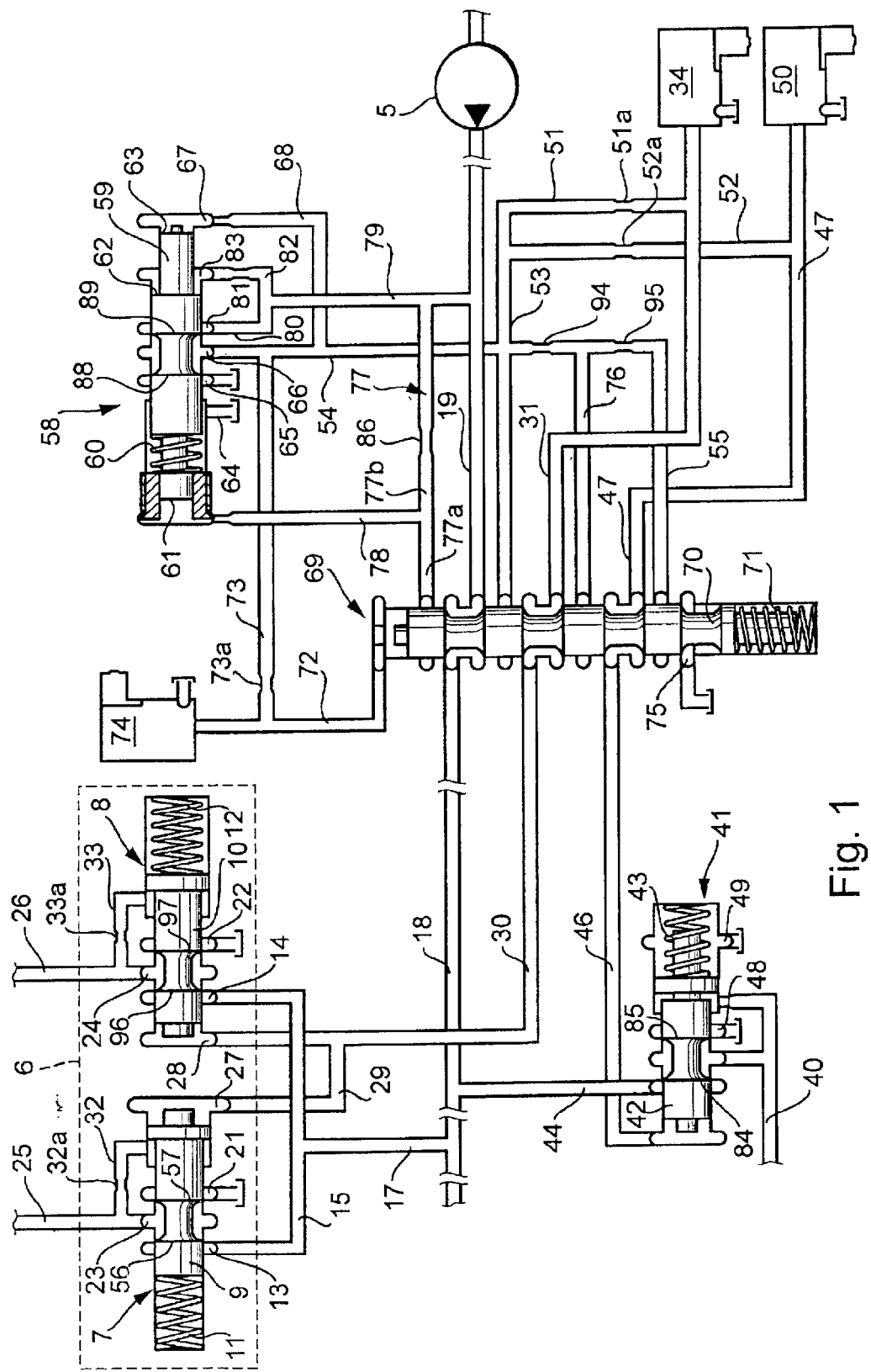
FIG. 1 shows a hydraulic circuit diagram for controlling an automatic transmission in accordance with the invention when it is in the normal condition.
Figure 4:
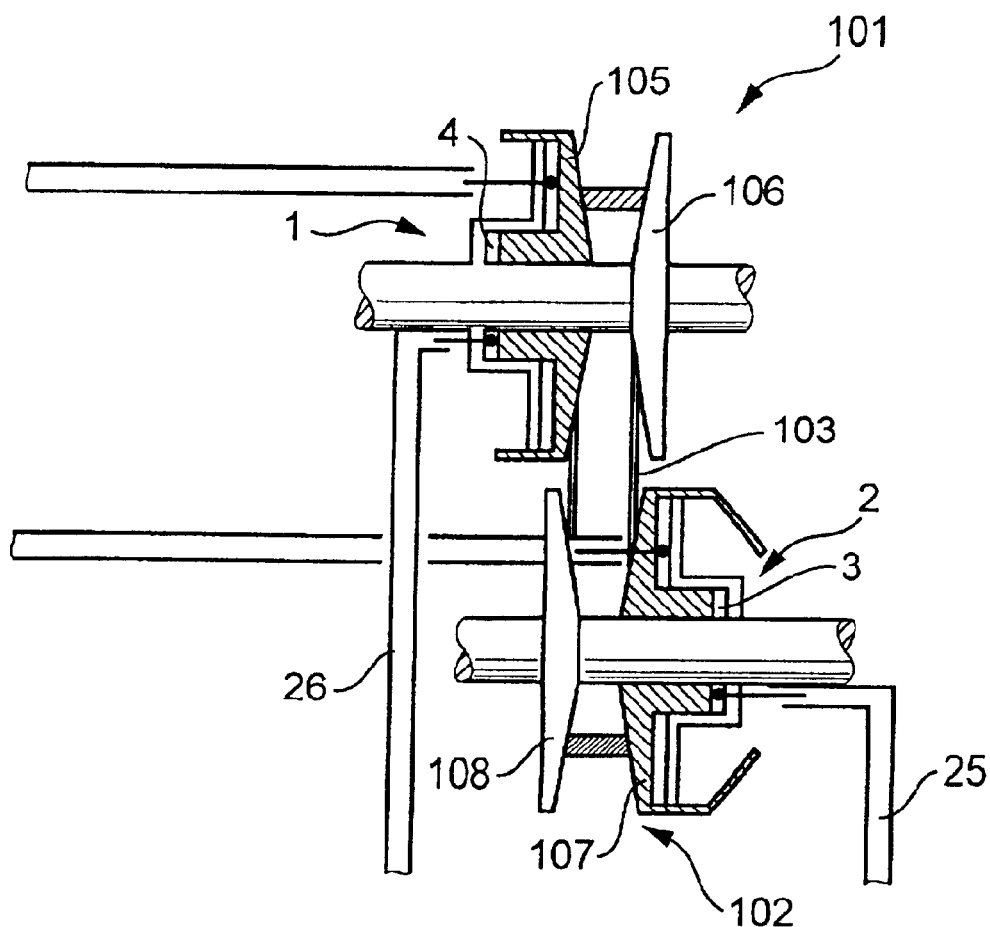
FIG. 4 shows a hydraulic circuit diagram for two conical disk sets of a belt-driven, conical pulley transmission.

FIG. 1 shows a hydraulic circuit diagram for the control of a continuously variable, belt-driven, conical pulley transmission, such as the transmission shown schematically in FIG. 4. The belt-driven, conical pulley transmission shown in FIG. 4 includes an input-side conical disk pair 101 and an output-side conical disk pair 102. The transmission of power between the two conical disk pairs 101 and 102 takes place by a steel band 103. Each conical disk pair 101, 102 has an axially-movable conical disk 105, 107 and an axially-fixed conical disk 106, 108. The axially-movable conical disks 105, 107 are arranged diagonally opposite each other. An axial displacement of conical disks 105, 107 causes the effective lever arms of the conical disk pairs 101, 102 to become larger or smaller in opposite directions. Axial displacement of the movable conical disks 105, 107 is achieved by adjusting devices 1, 2.

Adjusting devices 1, 2 for changing the transmission ratio of the automatic transmission include two working chambers 3 and 4. In order to achieve an adjustment of the transmission ratio, working chambers 3 and 4 are alternately filled with a working medium by a pump 5 in order to vary the spacing between the axially-movable conical disks 105, 107 and the associated axially-fixed conical disks 106 and 108. Pump 5 has a mechanical drive that is coupled with the crankshaft or the camshaft of an internal combustion engine of a motor vehicle. In that way the flow delivered by pump 5 increases or decreases in proportion to the rotational speed of the internal combustion engine.

The pressure in the working chambers 3 and 4 is controlled by a first control device 6 (see FIG. 1). That device includes two pressure recirculation control valves 7 and 8. Control valves 7 and 8 each include a respective guided, axially-movable spool 9, 10. Spools 9 and 10 are in each case biased in an axial direction by a respective spring 11, 12. On each of control valves 7 and 8 there is provided a respective port 13, 14 for the working medium delivered by pump 5. The working medium is a hydraulic fluid. Ports 13 and 14 are interconnected with each other by a conduit 15, from which extends a conduit 17. Conduit 17 is connected with the pressure side of pump 5 by conduits 18 and 19.

Additionally, ports 21 and 22 are provided on control valves 7 and 8 and are connected to an unpressurized chamber, for example a reservoir for the hydraulic fluid. Furthermore, control valves 7 and 8 also have ports 23 and 24. Port 23 is connected with working chamber 3 (see FIG. 4) by a conduit 25. Port 24 is connected with working chamber 4 (see FIG. 4) by a conduit 26. The pressure recirculation of spools 9 and 10 is realized by means of conduits 32 and 33 that extend from respective conduits 25 and 26. In conduits 32 and 33 there is arranged a respective orifice plate 32a, 33a.

Finally, control valves 7 and 8 also have ports 27 and 28, through which the pilot pressure acts on the end faces of spools 9 and 10 that face away from springs 11 and 12. Ports 27 and 28 of control valves 7 and 8 are connected with a second control device 34 by conduits 29, 30, and 31. Second control device 34 is an electrically-controlled proportional valve.

In the normal condition of the automatic transmission, a constant pilot pressure exists in conduits 29, 30, and 31. By the electrically-controlled proportional valve 34, the prevailing pilot pressure in conduits 29, 30, and 31 can be changed as needed.

When the pilot pressure that exists at ports 27 and 28 of control valves 7 and 8 increases, spools 9 and 10 move against the respective opposed spring bias forces. Two control edges 56 and 57 are formed on control spool 9. Two control edges 96 and 97 are formed on control spool 10. When spool 9 moves toward spring 11 because of increased pilot pressure at port 27, control edge 56 opens a connection between ports 13 and 23 on control valve 7, and the working medium delivered by pump 5 reaches working chamber 3 through conduit 25. At the same time, a connection is opened on control valve 8 between ports 24 and 22, and the working medium existing in working chamber 4 can flow out into the unpressurized chamber through conduit 26. An increase in the pilot pressure therefore leads to an increase in the pressure in working chamber 3 and a decrease in the pressure in working chamber 4.

When the pilot pressure at ports 27 and 28 of control valves 7 and 8 decreases, the result is that spools 9 and 10 move in the direction of the spring force exerted by the biasing forces imposed by springs 11 and 12. Consequently, control edge 57 opens a connection between ports 23 and 21 on control valve 7. As a result, the working medium that exists in working chamber 3 can flow out into the unpressurized chamber through conduit 25. At the same time, control edge 96 on spool 10 ensures that a connection between ports 14 and 24 on control valve 8 is opened. By that connection, the working medium delivered by pump 5 reaches working chamber 4 through conduit 26. Consequently, the pressure in working chamber 4 increases and the pressure in working chamber 3 decreases. That, in turn, effects an adjustment in the transmission ratio of the automatic transmission to fast (overdrive).

Figure 5:
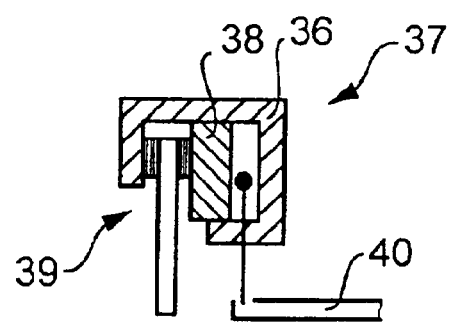
FIG. 5 shows a hydraulic circuit diagram for a starting clutch.

The hydraulic circuit diagram shown in FIG. 5 represents a second adjusting device 37. Second adjusting device 37 serves to actuate a starting clutch 39. Adjusting device 37 for starting clutch 39 has a cylinder 36 in which a piston 38 is movably received for back and forth movement. Piston 38 is, for example, the pressure plate of a clutch, which interacts with the friction linings of a clutch disk.

The interior of cylinder 36 is connected with a first control device 41 (see FIG. 1) for the starting clutch by a conduit 40. First control device 41 is a pressure recirculation control valve. In control valve 41, a spool 42 is movably received for back and forth movement against the biasing force of a spring 43. Control valve 41 is connected by a conduit 44 to conduit 18, which, in turn, is connected by conduit 19 to the pressure side of pump 5. Pilot pressure is applied through conduit 46 to the end face of spool 42 of control valve 41 that faces away from pressure-biased spring 43. The end face of spool 42 of the control valve 41 that faces away from the biasing spring 43 is acted on by a pilot pressure through a conduit 46. Conduit 46 is connected with a second control device 50 by a conduit 47. Second control device 50 is an electrically-controlled proportional valve.

In the normal condition of the automatic transmission, the prevailing pilot pressure in conduits 46 and 47 can be varied by electrically-controlled proportional valve 50 to operate the starting clutch (not shown). On control spool 42 of control valve 41 two control edges 84 and 85 are formed. Additionally, two ports 48 and 49 to a pressure relief chamber are provided on control valve 41.

When the pilot pressure in conduit 46 increases, the result is that spool 42 of control valve 41 is moved against the biasing force of spring 43. In such a displacement of spool 42, control edge 85 opens a connection from the interior of cylinder 36 through conduit 40 to port 48, which is connected to the unpressurized chamber. Consequently, the pressure in the interior of cylinder 36 decreases, whereby the starting clutch engages, since the clutch is engaged when there is no pressure.

When the pilot pressure in conduit 46 decreases, spool 42 is moved in the opposite direction by the biasing force of spring 43 in such a way that a connection between conduit 44 and conduit 40 is opened. The result is the working medium that is delivered by pump 5 is delivered to the interior of cylinder 36. The associated pressure increase in the interior of cylinder 36 causes the starting clutch to be disengaged.

Pilot pressure conduits 31 and 47 are connected with a conduit 53 by conduits 51 and 52, in each of which an orifice plate 51a, 52a, respectively, is provided. A conduit 54 extends from conduit 53 to a third control device that includes a hydraulically-operated control valve 58.

A control plunger 59 is received in control valve 58 for back and forth movement against the biasing force of a spring 60. Two control edges 88 and 89 are provided on control plunger 59. Additionally, a first working surface 61 and a second working surface 62 are formed on control plunger 59 for the working medium delivered by pump 5. First working surface 61 has the same size for the working medium as second working surface 62. Beyond that, a third working surface 63 is formed on control plunger 59, against which the regulated pilot pressure acts.

Two ports 64 and 65 are provided on control valve 58 that are connected to the pressure relief chamber. Additionally, a port 66 for conduit 54 is provided on control valve 58. Moreover, control valve 58 is provided with a port 67 to which a conduit 68 is connected. Conduit 68 runs to conduit 54. Finally, two ports 81 and 83 are provided on control valve 58, to which conduits 80 and 82 are connected, the latter of which are connected to each other. From the junction of conduits 80 and 82 there extends a conduit 79 that runs to conduit 19.

In FIG. 1 the automatic transmission is in its normal condition. In the normal condition the same working medium pressure that is delivered by pump 5 is applied to first working surface 61 and to second working surface 62. Pilot pressure acts on third working surface 63 of control plunger 59. When the pilot pressure at working surface 63 increases, control plunger 59 moves against the biasing force of spring 60. As a result, control edge 88 opens a conduit between ports 65 and 66 of control valve 58. That leads to a decrease in the pilot pressure. When the pilot pressure on third working surface 63 of control plunger 59 decreases, control plunger 59 is displaced toward port 67 because of the biasing force of spring 60. Control edge 89 then opens a conduit between ports 81 and 66 of control valve 58. As a result the pilot pressure increases. In the normal condition of the automatic transmission, control valve 58 acts as a pressure regulator for maintaining the pilot pressure constant. Orifice plates or throttles in conduits 51 and 52, as well as in conduit 68, ensure that the function of second control devices 34 and 50 is not impaired in the normal condition of the automatic transmission.

A constant pilot pressure serves as the supply pressure for proportional valves 34, 50. Proportional valves 34, 50 can set a pressure of near zero to maximum pilot pressure in order to regulate the transmission ratio change and the function of the starting clutch.

Control devices 34, 50, and 58 are connected by a switching device 69 to adjusting devices 1, 2 for adjusting the transmission ratio of the automatic transmission and to adjusting device 37 for the starting clutch of the transmission. In switching device 69, a switching spool 70 is received for back and forth movement against the biasing force of a spring 71. Switching device 69 is connected to conduit 54 by a conduit 72 and a conduit 73, in which an orifice plate 73a is arranged. Additionally, a 2/2 switching valve 74 is connected at the end of conduit 72.

In the normal condition of the automatic transmission the 2/2 switching valve 74 is closed. In the event of a failure of the electronic system, the 2/2 switching valve 74 releases a connection between conduit 72 and the pressure relief chamber. The pressure relief of conduit 72 causes the pressure at the end face of spool 70 that faces away from spring 71 to drop. Consequently, spool 70 moves upward toward conduit 72 because of the biasing force of spring 71. Switching device 69 has a port 75 to the pressure relief chamber. Additionally, a conduit 76 is connected to switching device 69 and runs to conduit 54. Beyond that, a conduit 77 is connected to switching device 69, from which a conduit 78 leads to first working surface 61 for the working medium that acts on control plunger 59 and which runs to conduit 79. A metering orifice plate 86 is provided in conduit 77 between the connection points for conduits 78 and 79. Beyond that, two orifice plates 94 and 95 are incorporated in conduit 54. Between orifice plates 94 and 95 is a connection point for conduit 76. A conduit 55 extends from orifice plate 95 to switching device 69. Adjacent to port 75 to the pressure relief chamber, switching device 69 has ports for conduits 55, 47, 76, 31, 53, 19, 77, 72, 18, 30, and 46.

In the normal condition of the automatic transmission, spool 70 is in its normal position as shown in FIG. 1. In the normal position of spool 70, proportional valve 50 is connected by conduit 47 and conduit 46 to control valve 41 for adjusting device 36, 37 of the starting clutch. Likewise, proportional valve 34 is connected by conduits 31, 30, and 29 to control valves 7 and 8 for adjusting devices 1, 2 for the transmission ratio of the automatic transmission. Conduits 31 and 47 are connected to control valve 58 by conduits 51 and 52, which are provided with orifice plates 51a, 52a. The pressure that can be controlled by proportional valves 34, 50, produces different adjusting and driving pressures. The adjustment of adjusting devices 1, 2, and 37 is controlled by control devices 6 and 41 through proportional valves 34 and 50.

In the event of a failure of the electronic system, electrically-controlled proportional valves 34 and 50 can also fail. In such a case, spring-force-actuated 2/2 switching valve 74 also opens, and spool 70 moves into the emergency position shown in FIG. 2.

Figure 2:
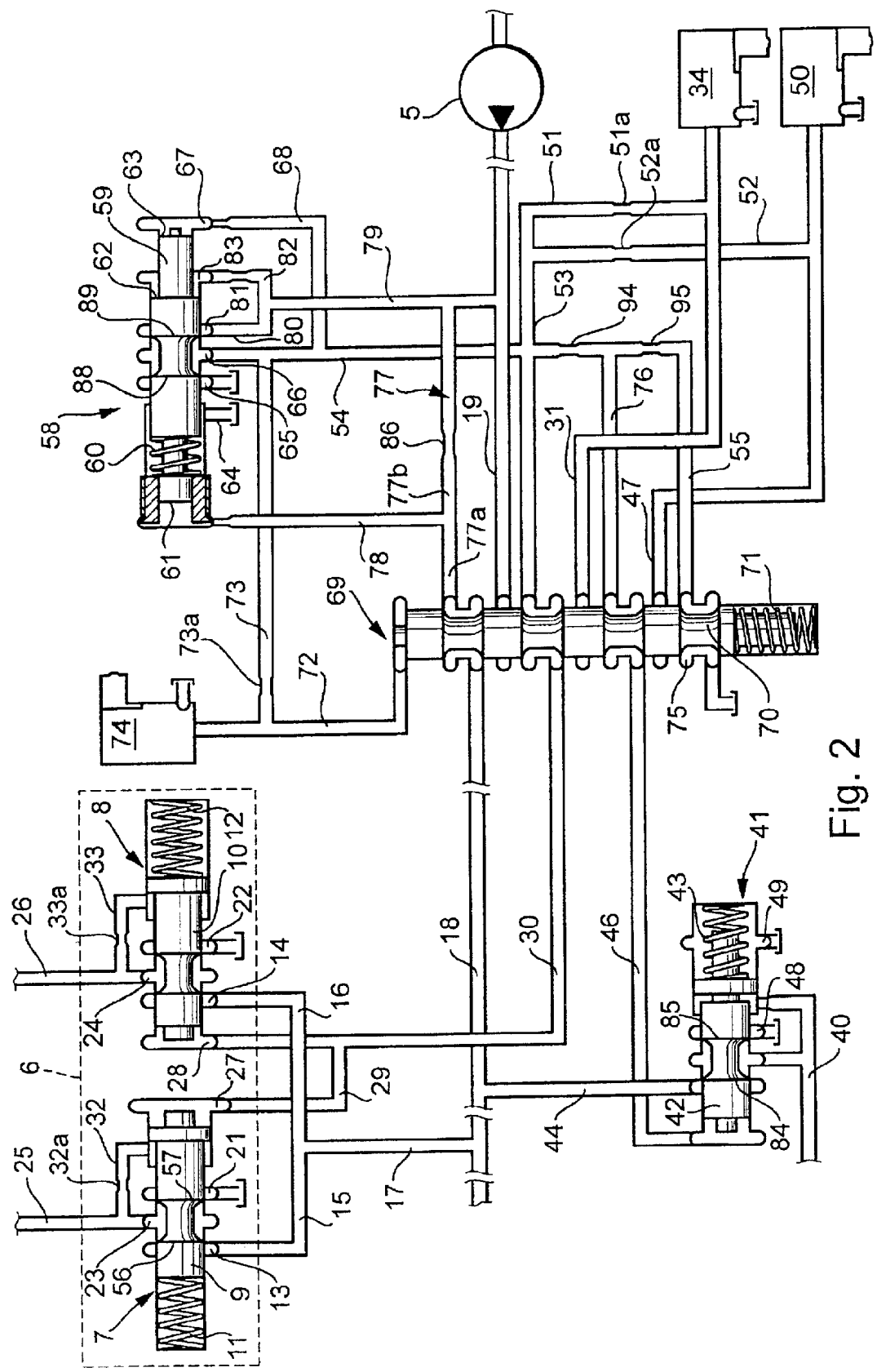
FIG. 2 shows the control system of FIG. 1 in the limp home condition.

FIG. 2 shows switching device 69 in the emergency position. Equivalent parts are provided with the same reference numerals so that the description of FIG. 1 applies. In the limp home position of spool 70, conduit 54, in which both orifice plates 94 and 95 are arranged, is connected with the pressure relief chamber by conduit 55. The pressure level is decreased because of the metering orifice plates 94, 95. As a result, the starting clutch engages before the transmission ratio control takes hold.

Additionally, conduit 76 is connected by conduit 46 with the end face of spool 42 that faces away from spring 43 of control valve 41. Moreover, conduit 53 is connected by conduits 30 and 29 with ports 27 and 28 of control valves 7 and 8. Finally, connecting conduit 77, which is provided between conduits 78 and 79 and which includes metering orifice plate 86, is connected by conduits 18, 17, and 44 to control valves 7, 8, and 41. Conduit 77 includes two sections 77a and 77b. Section 77a extends from switching device 69 to the connection point of conduit 78. Section 77b extends between the two connection points of conduits 78 and 54. Metering orifice plate 86 is arranged in section 77b, through which no medium flows in the normal condition of the automatic transmission, so that the same pressure exists on working surfaces 61 and 62 of control plunger 59.

In the limp home condition of the automatic transmission shown in FIG. 2, the working medium delivered by pump 5 through conduits 19, 79, and 77, as well as orifice plate 86 and conduit 78, reaches first working surface 61 for the working medium on control plunger 59 of third control device 58. Additionally, the working medium delivered by pump 5 through conduits 19, 79, and 82 reaches second working surface 62 for the working medium on control plunger 59 of third control device 58.

When the working medium flows through orifice plate 86 in conduit section 77b, which is the case in FIG. 2, the result is a drop in pressure. Because of the drop in pressure at metering orifice plate 86, a lower working medium pressure acts on first working surface 61 of control plunger 59 than on second working surface 62. Since first working surface 61 is the same size as second working surface 62, the higher pressure acting on second working surface 62 causes control plunger 59 to be displaced against the biasing force of spring 60 toward conduit 78—to the left as viewed in FIG. 2. That results in a decrease in the pilot pressure acting on third working surface 63.

With increasing rotational speed of the internal combustion engine, the volumetric flow delivered by pump 5 increases. That causes the pressure difference across metering orifice plate 86 also to increase. That, in turn, results in a further decrease in the pilot pressure. As a result, it is established that the pilot pressure decreases with increasing rotational speed of the internal combustion engine. Conversely, the pilot pressure increases with decreasing rotational speed.

The pilot pressure, which is dependent upon the speed of the internal combustion engine, acts on third working surface 63 of control plunger 59 of third control device 58. Third working surface 63 for the pilot pressure is in communication with first control device 6 of adjusting device 1, 2 for the transmission ratio of the automatic transmission by conduit 68, conduit 54, conduit 53, conduit 30, and conduit 29. Additionally, third working surface 63 for the pilot pressure is in communication with first control device 41 for adjusting device 37 for the starting clutch by conduits 68, 54, 76, and 46. A drop in the pilot pressure is achieved through both orifice plates 94 and 95 in conduit 54, which is connected to the pressure relief chamber. The drop in pressure results in a higher pressure acting on working surface 63 of control plunger 59 and at ports 27, 28 than on the end face of spool 42 that faces away from spring 43. By arranging orifice plate 94 between the intersection of conduits 53, 54 and the intersection of conduits 76, 54, the pilot pressure for control device 6 for the transmission ratio is greater than the pilot pressure for control device 41 for the starting clutch because of the arrangement of 94 between 54/30 and 76/46. The pressure drop across orifice plates 94 and 95 only occurs when conduit 55 is relieved into the tank, which represents a pressure relief chamber, through port 75.

Control valve 41 for the starting clutch has a falling characteristic line, that is, a decreasing pilot pressure ensures an increase in the clutch pressure. As described above, the pilot pressure decreases with increasing rotational speed. In the limp home condition, the clutch will therefore be engaged at increasing rotational speed of the internal combustion engine.

In the embodiment shown in FIGS. 1 and 2, control valve 41 is arranged in such a way that the starting clutch engages at a decreasing pilot pressure. If that is not the case, a so-called reversing spool is used. The reversing spool serves to produce a relationship between increasing pressure difference across the metering orifice plate and the necessary pilot pressure for operating the starting clutch and the transmission ratio adjustment. Depending upon the connection of working surfaces 61, 62, a direct or indirect relationship is produced.

Figure 3:
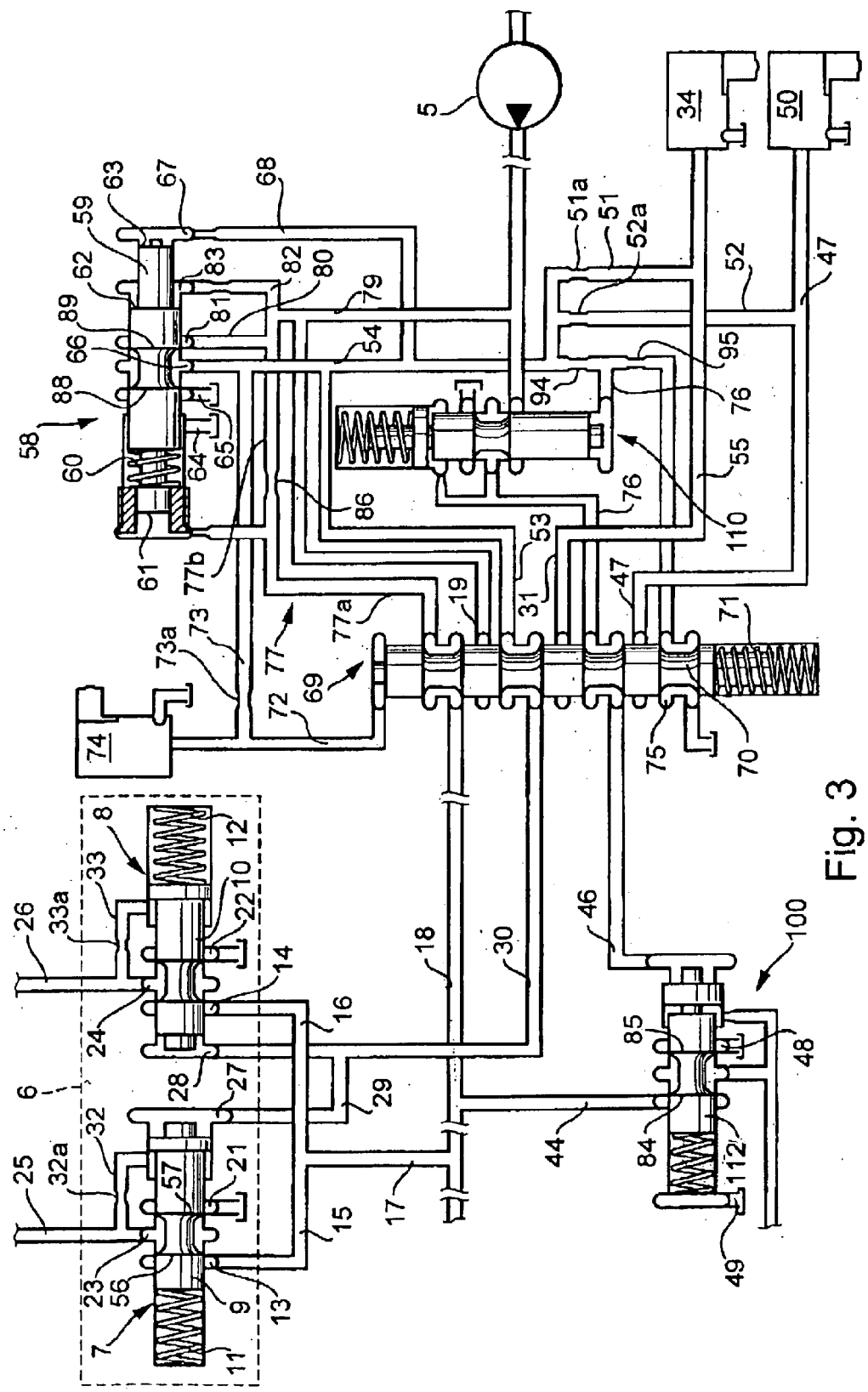
FIG. 3 shows a hydraulic circuit diagram for controlling an automatic transmission in the limp home condition in accordance with another embodiment of the invention.

FIG. 3 is a hydraulic circuit diagram of an automatic transmission in accordance with another embodiment of the invention. The control shown in FIG. 3 largely corresponds with the control shown in FIGS. 1 and 2. Equivalent parts are identified by the same reference numerals so that to that extent reference should be made to the description of FIGS. 1 and 2. In the following, only the differences between the two embodiments are pointed out.

In the embodiment shown in FIG. 3, adjusting device 37 for the starting clutch is controlled by a control valve 100. Control valve 100 is a classic pressure reducing valve. With increasing pilot pressure, the output pressure decreases. In order to ensure engagement of the clutch in the limp home condition at an increasing rotational speed of the internal combustion engine, a reversing spool 112 is required. Reversing spool 112 ensures that the change in pilot pressure occurs exactly opposite from that in the embodiment shown in FIGS. 1 and 2. In other respects the function of the arrangement shown in FIG. 3 is identical to the arrangement shown in FIGS. 1 and 2.

The claims included in the application are illustrative and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as renunciation to independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A method for operating an automatic transmission of a motor vehicle as a function of at least the engine rotational speed, said method comprising the steps of: adjusting the transmission ratio in an emergency mode of the automatic transmission after a starting process to change the transmission ratio to a speed increasing ratio when the engine rotational speed increases, changing the transmission ratio to a speed reducing ratio when the engine rotational speed decreases, to maintain the engine rotational speed at a defined value, changing the transmission ratio after the starting process to a speed increasing ratio at increasing engine rotational speed until a smallest possible transmission ratio is reached, and maintaining that transmission ratio during a further increase in engine rotational speed.

2. A method for operating an automatic transmission of a motor vehicle as a function of at least the engine rotational speed, said method comprising the steps of: adjusting the transmission ratio in an emergency mode of the automatic transmission after a starting process to change the transmission ratio to a speed increasing ratio when the engine rotational speed increases, and changing the transmission ratio to a speed reducing ratio when the engine rotational speed decreases, to maintain the engine rotational speed at a defined value, changing the transmission ratio after the starting process to a speed reducing ratio at decreasing engine rotational speed until a largest possible transmission ratio is reached, and maintaining that transmission ratio during a further decrease in engine rotational speed.

3. A method in accordance with claim 2, including the step of interrupting the transmission of torque from a drive element to a driven element with one of a clutch and a torque converter at a further decrease in engine rotational speed.

4. A method in accordance with claim 1, wherein the defined value at which the engine rotational speed is kept constant is greater than engine stall speed.

5. An automatic transmission for a variable speed internal combustion engine, said transmission comprising: a delivery system for delivering a working medium, the transmission having a working-medium-actuated transmission ratio adjustment arrangement that includes at least one transmission ratio adjusting device that receives working medium from a first control device that is controlled by a pilot pressure that is accurately modified by an electrically-controlled second control device to actuate the transmission ratio adjusting device, a third control device that is actuated by the working medium delivered by the delivery system, wherein the third control device controls a pilot pressure that operates to control operation of the first control device, a first switching device that is switchable between a normal operation position at which the pilot pressure is maintained substantially constant and an emergency operation position at which the pilot pressure is a function of the rotational speed of the internal combustion engine, to control the transmission when the second control device becomes inoperative after a starting process, and a second switching device operatively coupled with the first switching device and responsive to an electrical failure to relieve a working medium pressure acting on the first switching device to cause the first switching device to switch to the emergency operation position.

6. An automatic transmission in accordance with claim 5, wherein the delivery system for the working medium includes a pump whose delivered volumetric flow is a function of the speed of the internal combustion engine.

7. An automatic transmission for a variable speed internal combustion engine, said transmission comprising: a delivery system for delivering a working medium, the transmission having a working-medium-actuated transmission ratio adjustment arrangement that includes at least one transmission ratio adjusting device that receives working medium from a first control device that is controlled by a pilot pressure that is accurately modified by a second control device to actuate the transmission ratio adjusting device, a third control device that is actuated by the working medium delivered by the delivery system, wherein the third control device controls a pilot pressure that operates to control operation of the first control device, and a switching device that is switchable between a normal operation position at which the pilot pressure is maintained substantially constant and an emergency operation position at which the pilot pressure is a function of the rotational speed of the internal combustion engine, to control the transmission when the second control device becomes inoperative, wherein the delivery system for the working medium includes a pump whose delivered volumetric flow is a function of the speed of the internal combustion engine, and wherein the third control device includes an axially displaceable, spring-biased spool having first and second working surfaces for controlling flow of the working medium delivered by the delivery system, and having a third working surface against which the pilot pressure acts, wherein the first and the second working surfaces for the working medium have the same area.

8. An automatic transmission in accordance with claim 7, wherein the first and second working surfaces for the working medium at the spool of the third control device are in communication with each other through a connecting conduit in which an orifice plate is provided through which the working medium delivered by the pump flows when the switching device is in the emergency operation position.

9. An automatic transmission in accordance with claim 8, wherein the switching device includes an axially-displaceable, spring-biased spool that is switched into the emergency operation position condition by the spring bias force from its normal operation position into the emergency operation position to interrupt a direct connection between the pump and the transmission ratio adjusting device, and that provides a connection between the pump and the transmission ratio adjusting device through the orifice plate in the connecting conduit between the first and second working surfaces for the working medium at the spool of the third control device.

10. An automatic transmission in accordance with claim 9, including an adjusting device for a starting clutch, and wherein the transmission ratio adjusting device for adjusting the transmission ratio of the automatic transmission and the adjusting device for the starting clutch are coupled with the pump and with the third control device.

11. An automatic transmission in accordance with claim 10, wherein in the emergency operation position of the spool of the switching device, a control pressure connecting conduit between the third working surface for the pilot pressure at the spool of the third control device and a connection to a pressure release chamber is disconnected, and wherein a first orifice plate is positioned in branch a conduit extending to the starting clutch adjusting device and a second orifice plate is positioned in a branch conduit that extends to the transmission ratio adjusting device.

12. A method in accordance with claim 2, wherein the defined value at which the engine rotational speed is kept constant is greater than engine stall speed.

* * * * *